US008197857B2

(12) United States Patent
Dressler et al.

(10) Patent No.: US 8,197,857 B2
(45) Date of Patent: Jun. 12, 2012

(54) METHOD FOR ELIMINATING CARBON DIOXIDE FROM WASTE GASES

(76) Inventors: Lawrence V. Dressler, Cranston, RI (US); Alexander Chirkov, Lincoln, RI (US)

( * ) Notice: Subject to any disclaimer, the term of this patent is extended or adjusted under 35 U.S.C. 154(b) by 266 days.

(21) Appl. No.: 12/479,772

(22) Filed: Jun. 6, 2009

(65) Prior Publication Data

US 2009/0305388 A1 Dec. 10, 2009

Related U.S. Application Data

(63) Continuation-in-part of application No. 12/137,613, filed on Jun. 12, 2008.

(60) Provisional application No. 61/059,407, filed on Jun. 6, 2008.

(51) Int. Cl.
| | |
|---|---|
| A61L 9/01 | (2006.01) |
| B01D 19/00 | (2006.01) |
| C07C 19/00 | (2006.01) |
| C07C 21/00 | (2006.01) |
| C07C 25/00 | (2006.01) |
| C07D 487/00 | (2006.01) |
| C02F 1/02 | (2006.01) |
| C02F 1/42 | (2006.01) |
| C10G 32/00 | (2006.01) |
| A01N 65/00 | (2009.01) |

(52) U.S. Cl. ............ 424/673; 95/156; 95/183; 210/600; 210/673; 435/281; 532/1; 562/1; 562/824; 570/101; 570/123

(58) Field of Classification Search .................. None
See application file for complete search history.

(56) References Cited

U.S. PATENT DOCUMENTS

| | | | |
|---|---|---|---|
| 4,263,263 | A | 4/1981 | Vaseen |
| 4,733,528 | A | 3/1988 | Pinto |
| 4,869,017 | A | 9/1989 | Bird et al. |
| 5,151,347 | A | 9/1992 | Delente et al. |
| 5,536,654 | A | 7/1996 | Gudin et al. |
| 5,618,506 | A | 4/1997 | Suzuki et al. |
| 5,637,499 | A | 6/1997 | Turick |
| 5,733,572 | A | 3/1998 | Unger et al. |
| 5,773,587 | A | 6/1998 | Lowe et al. |
| 5,853,752 | A | 12/1998 | Unger et al. |
| 6,083,740 | A | 7/2000 | Kodo et al. |
| 6,146,657 | A | 11/2000 | Unger et al. |
| 6,156,561 | A | 12/2000 | Kodo et al. |
| 6,160,161 | A | 12/2000 | Trabelsi et al. |
| 6,228,145 | B1 | 5/2001 | Falk-Pedersen et al. |
| 6,337,059 | B1 | 1/2002 | Schubert et al. |
| 6,524,486 | B2 | 2/2003 | Borodyanski et al. |
| 6,743,779 | B1 | 6/2004 | Unger et al. |
| 6,755,892 | B2 | 6/2004 | Nalette et al. |
| 7,153,344 | B2 | 12/2006 | Filippi et al. |
| 2001/0031740 | A1 | 10/2001 | Unger et al. |
| 2002/0039556 | A1 | 4/2002 | Dyvik et al. |
| 2004/0176473 | A1 | 9/2004 | Unger et al. |
| 2005/0080029 | A1 | 4/2005 | Unger et al. |
| 2006/0112678 | A1 | 6/2006 | Kaboord et al. |
| 2008/0072760 | A1 | 3/2008 | Imada et al. |
| 2009/0151241 | A1 | 6/2009 | Dressler et al. |

FOREIGN PATENT DOCUMENTS

| | | |
|---|---|---|
| JP | 52031885 | 3/1977 |
| WO | 2006020177 A1 | 2/2006 |

OTHER PUBLICATIONS

King A.T., Mulligan B. J., Lowe K. C.; "Perfluorochemicals for gas transport and improvement of cell cultures", NCBI, Advances in Experimental Medicines and Biology, vol. 227, pp. 283-290 (1990), www.ncbi.nlm.nih.gov/sites/entrez?Db=pubmed&Cmd=ShowDe.
Lowe K.C., Anthony P., Davey M. R., Power J. B., Washington C., "Enhanced protoplast growth at the interface between oxygenated fluorocarbon liquid and acqueous culture medium supplemented with pluronic F-68", NCBI, Advances in Experimental Medicines and Biology, vol. 23, No. 3, pp. 417-422 (1995), www.ncbi.nlm.nih.gov/sites/entrez?Db=pubmed&Cmd-ShowDe.
Lowe K. C., Anthony P., Wardrop J., Davey M. R., Power J. B., "Perfluorochemicals and cell biotechnology," NCBI, Artificial Cells, Blood Substitutes, and Immobilization Biotechnology, vol. 25, No. 3, pp. 261-271 (1997), www.ncbi.nlm.nih.gov/sites/entrez?Db=pubmed&Cmd=ShowDe.
Damiano, D. and Wang, S. S., "Novel use of a perfluorocarbon for supplying oxygen to aerobic submerged cultures," Biotechnology Letters, Springer Netherlands, Feb. 1985, pp. 81-86, vol. 7, No. 2.
Lowe K. C., Anthony P., Power B., Davey M. R., "Novel approaches for regulating gas supply to plant systems in vitro: application and benefits of artificial gas carriers," In Vitro Cellular and Developmental Biology-Plant, BioOne Online Journals Access Control, Nov. 2003, pp. 557-586, vol. 39, Issue 6, www.bioone.org/perserv/?request=get-document&doi-10.1290%2F1054-5476.
Shchukin D. G., and Sviridov D. V., "Photocatalytic processes in spatially confined micro-and nanoreactors," Journal of Photochemistry and Photobiology C: Photochemistry Reviews, Mar. 2006, pp. 23-29, vol. 7, Issue 1.
Lowe K.C., Davey M. R., Power J. B., "Perfluorochemicals:their applications and benefits to cell culture," NCBI, Trends Biotechnol, Jun. 1998, pp. 272-277, vol. 16, No. 6, www.ncbi.nlm/nih.giv/sites/entrez?Db=pubmed&Cmd=ShowDe.
Matthews W. H. and Kylsra J.A., "A fluorocarbon emulsion with a high solubility for CO2," Undersea Biomedical Research, Jun. 1976 pp. 113-120, vol. 3, No. 2.

*Primary Examiner* — Debbie K Ware
(74) *Attorney, Agent, or Firm* — Barlow, Josephs & Holmes, Ltd.

(57) ABSTRACT

A method for the elimination of carbon dioxide from waste gases includes the following steps. First, waste gases, which include carbon dioxide, are provided from a source for waste gases. Next, the waste gases are contacted with an absorbent composition that includes perfluorodecalin solution. The waste gases, especially the carbon dioxide, are then absorbed by the absorbent composition. The absorbent composition thereby absorbs the waste gases to eliminate the carbon dioxide.

3 Claims, 12 Drawing Sheets

TABLE 4

Percent Solubility in Microbiological Medium

| Gas | Control | PFC 40 | PFC 72 | PFC 77 |
|---|---|---|---|---|
| CO₂ | 80 | 85 | 82 | 85 |
| N₂O | 27 | 59 | 55 | 56 |
| CH₄ | 3 | 7 | 24 | 11 |
| CO | 2 | 9 | 29 | 24 |

METHOD FOR ELIMINATING CARBON DIOXIDE FROM WASTE GASES

CROSS REFERENCE TO RELATED APPLICATIONS

This application is related to and claims priority from earlier filed provisional patent application Ser. No. 61/059,407 filed Jun. 6, 2008, the entire contents of which are incorporated herein by reference. This application is a continuation-in-part of non-provisional patent application Ser. No. 12/137,613 filed Jun. 12, 2008, the entire contents of which are incorporated herein by reference.

BACKGROUND OF THE INVENTION

The invention generally relates to a method for removing or eliminating carbon dioxide from waste gases. More specifically, the present invention is a method for removing or eliminating carbon dioxide from waste gases by contacting the waste gases with an absorbent composition. The absorbent composition absorbs the waste gases which thereby eliminates the carbon dioxide from the waste gases.

In recent years, a greenhouse effect by carbon dioxide is indicated as one cause of the warming phenomenon of the earth, and its prompt resolution is globally required in order to protect earth circumstances. The generation sources of carbon dioxide extend in active fields of all humans in which fossil fuels are burned, and there is a tendency that the discharge regulation of carbon dioxide will be further tightened in the future. Thus, for power generation facilities such as power plants in which a large amount of the fossil fuel is used, there are energetically researched a method for removing and recovering carbon dioxide from a combustion exhaust gas.

Purification of process gas streams by the removal of acid gases such as carbon dioxide is required in many major industrial processes such as hydrogen manufacture for refinery hydrotreating, synthesis gas manufacture from coal, purification of natural gas, and ammonia manufacture. Also, the purification of gas streams from automobile combustion gases is also a major concern for auto manufacturers. Bulk removal of acid gases from such streams is usually accomplished by use of a scrubbing solution composed of a solvent.

As disclosed below, there are many patents that discuss how to separate an acidic gas, such as carbon dioxide, from a gas stream. Japanese Patent Application Laid-open No. 100180/1978 discloses a method for removing an acidic gas which comprises bringing a usually gaseous mixture into contact with an amine-solvent liquid absorbent comprising (1) an amine mixture comprising at least 50 mole % of a steric hindrance amine constituting a part of a ring and having at least one secondary amino group bonded to either of a secondary carbon atom or a tertiary carbon atom or a primary amino group bonded to the tertiary carbon atom, and at least about 10 mole % of the tertiary amino-alcohol, and (2) a solvent for the above-mentioned amine mixture which functions as a physical absorbent for the acidic gas. Usable examples of the steric hindrance amine include 2-piperidine ethanol[2-(2-hydroxyethyl)-piperidine] and 3-amino-3-methyl-1-butanol, and a usable example of the tertiary amino-alcohol is 3-dimethylamino-1-propanol. Furthermore, an example of the solvent is a sulfoxide compound which may contain water in an amount of 25% by weight or less, and an example of a gas to be treated is "a usually gaseous mixture containing carbon dioxide and hydrogen sulfide at high concentrations, for example, 35% of Carbon dioxide and 10-12% of $H_2S$" on page 1, left upper column of the same gazette. In the undermentioned examples, Carbon dioxide itself is used.

In Japanese Patent Application Laid-open No. 71819/1986, there is described a composition for the scraping of an acidic gas which contains a non-aqueous solvent such as a steric hindrance amine or sulfolane. As an example of the primary monoamino alcohol of the steric hindrance, 2-amino-2-methyl-1-propanol (abbreviated to AMP) is exemplified and used. In examples, Carbon dioxide and nitrogen as well as Carbon dioxide and helium are used. Furthermore, as absorbents, an aqueous solution of an amine and potassium carbonate, and the like are used. The use of water is also referred to. In addition, this gazette describes the advantage of the steric hindrance amine in the absorption of carbon dioxide by reaction formulae.

In Chemical Engineering Science, Vol. 41, No. 4, pp. 997-1,003, there is disclosed a carbon dioxide gas absorption behavior of an aqueous AMP solution which is a hindered amine. As gases to be absorbed, carbon dioxide and a mixture of carbon dioxide and nitrogen at atmospheric pressure are used.

U.S. Pat. No. 3,622,267 discloses a technique in which an aqueous mixture containing methyldiethanolamine and monoethylmonoethanolamine is used to purify a high-partial pressure carbon dioxide contained in a synthetic gas such as a partially oxidized gas of a crude oil or the like, for example, a synthetic gas containing 30% of Carbon dioxide at 40 atm.

Consequently, there is a need for an absorbent composition capable of absorbing carbon dioxide from waste gases in a more efficient manner.

BRIEF SUMMARY OF THE INVENTION

The invention preserves the advantages of prior methods for eliminating carbon dioxide from waste gases. In addition, it provides new advantages not found in currently available methods for eliminating carbon dioxide from waste gases and overcomes many disadvantages of such currently available methods. The present invention provides a method for the elimination of carbon dioxide from waste gases using an absorbent composition. When waste gases are emitted and contacted with the absorbent composition, the carbon dioxide within the waste gases is absorbed or dissolved into the absorbent composition thereby eliminating carbon dioxide from the waste gases.

The invention transfers carbon dioxide in increased concentrations using perfluorodecalin for growth of algae in a photobioreactor. First, a perfluorodecalin solution is provided and mixed with a biological growth medium and a surfactant. The biological growth medium, perfluorodecalin solution, and surfactant mixture are then emulsified by circulation in a high-pressure emulsifier. The emulsified biological growth medium, perfluorodecalin solution, and surfactant mixture are then added to a photobioreactor containing algae capable of photosynthetically utilizing carbon dioxide. After adding carbon dioxide to the photobioreactor, the carbon dioxide dissolves in the perfluorodecalin solution at a higher concentration than in the growth medium. Conditions sufficient for the algae to perform photosynthesis using carbon dioxide from the perfluorodecalin solution are maintained thereby increasing the growth rate of the algae in increased concentration of carbon dioxide due to the increased solubility of carbon dioxide in the perfluorodecalin solution.

The invention also consists of a photobioreactor system used in the method for increased production of algae. The photobioreactor system has a container for containing algae and a light within the container for photosynthesis. The photobioreactor system has a means for introducing emulsion containing biological growth medium, perflurodecalin solution, and surfactant mixture to contact the algae. The photobioreactor system has a means for introducing carbon dioxide into the container such that the carbon dioxide dissolves in the perfluorodecalin solution at a higher concentration than in the growth medium and the carbon dioxide photosynthetically reacts with the algae in said container means in the presence of light. The photobioreactor has a means for controlling a temperature and agitation rate of the growth medium, perflourodecalin solution and algae within the photobioreactor to maintain conditions sufficient for the algae to perform photosynthesis using carbon dioxide from the perfluorodecalin solution, thereby increasing the growth rate of the algae in increased concentration of carbon dioxide due to the increased solubility of carbon dioxide in the perfluorodecalin solution. The photobioreactor has a means for circulating the emulsion within said container to facilitate photosynthesis of algae within said container.

The invention provides a method for the elimination of carbon dioxide from waste gases which includes the following steps. First, waste gases, which include carbon dioxide, are provided from a source for waste gases, such as combustion of fuels, conversion from methane in a hydrogen plant, vehicle exhaust, power plant emissions, fermentation of sugar, thermal decomposition of limestone, sodium phosphate manufacturing, landfills, carbon dioxide springs, and other carbon dioxide sources. Next, the waste gases are contacted with an absorbent composition which includes perfluorodecalin solution. The waste gases, especially the carbon dioxide, are then absorbed by the absorbent composition. The absorbent composition thereby absorbs the waste gases to eliminate the carbon dioxide. The absorbent composition saturated with carbon dioxide ($CO_2$) absorbed from waste gases is then usable to facilitate growth of photoautotrophs, such as algae.

Also, the invention provides an absorbent composition used for increasing growth rate of photoautotrophs, such as algae, or other organisms that use photosynthesis. The absorbent composition for increasing the growth rate of photoautotrophs includes a perfluorodecalin solution and carbon dioxide absorbed from waste gases. The waste gas source includes, at least, the following: combustions of fuels, especially fossil fuels, power plant emissions, vehicle exhaust, conversion from methane in a hydrogen plant, fermentation of sugar, thermal decomposition of limestone, sodium phosphate manufacturing, landfills, carbon dioxide springs, and other carbon dioxide sources.

The invention also provides an absorbent apparatus for absorbing carbon dioxide from waste gases. The absorbent composition, which includes perfluorodecalin solution, for absorbing carbon dioxide from waste gases is provided within the apparatus. The absorbent composition is contained within the absorbent apparatus during contact with the waste gases. For example, the absorbent apparatus is a vehicle absorber unit connected to an exhaust system of a vehicle. In another example, the absorbent apparatus is a power plant absorber unit connected to a flue source, such as a flue stack. The waste gases are provided to the absorbent composition inside the absorbent apparatus using a waste gas delivery system. After the absorbent composition is contacted with the waste gases inside the apparatus, the absorbent composition saturated with carbon dioxide is removed from the absorbent apparatus to be used to facilitate the growth of photoautotrophs, such as algae.

In addition, the invention provides a system for eliminating carbon dioxide from waste gases to use in the production of biomass. The biomass, in one embodiment, are photoautotrophs and more specifically algae but can be any biomass used to produce renewable energy. The system provides a waste gas delivery system for providing waste gases. The absorbent composition that includes perflourodecalin solution is positioned to contact waste gases delivered by waste gas delivery system. After the absorbent composition is saturated with carbon dioxide, the absorbent composition is delivered by an absorbent composition delivery system to contact biomass. Upon contacting the absorbent composition with the biomass, and addition of a biological growth medium, the growth rate and lipid content of the biomass, such as algae, is increased.

Also, the invention provides a method for operating a photobioreactor using carbon dioxide absorbed from wastes gases. The method for operating the photobioreactor includes the following steps. First, waste gases are provided that include carbon dioxide by waste gas sources. Second, the waste gases are contacted with an absorbent composition that includes perfluorodecalin solution. Third, the waste gases are absorbed using the absorbent composition. Fourth, the absorbent composition saturated with carbon dioxide is delivered to the photobioreactor. Fifth, the absorbent composition contacts the photoautotrophs within the photobioreactor. Thereby, carbon dioxide is eventually released from absorbent composition to facilitate growth and lipid content of photoautotrophs, such as algae.

The invention also provides a method for operating an open-pond system using carbon dioxide from waste gases. Also, the invention provides a method for operating an open-pond system using carbon dioxide absorbed from wastes gases. The method for operating the open-pond systems includes the following steps. First, waste gases are provided that include carbon dioxide from waste gas sources. Second, the waste gases are contacted with an absorbent composition that includes perfluorodecalin solution. Third, the waste gases are absorbed using the absorbent composition. Fourth, the absorbent composition saturated with carbon dioxide is delivered to the open-pond system. Fifth, the absorbent composition contacts the photoautotrophs within the open-pond system. Thereby, carbon dioxide is eventually released from absorbent composition to facilitate growth and lipid content of photoautotrophs, such as algae.

It is therefore an object of the present invention to deliver carbon dioxide in increased concentrations using perfluorodecalin for growth of algae in a photobioreactor to use in the production of biofuel.

It is another object of the present invention to provide a method for increasing solubility of carbon dioxide in the biological growth media by using perfluorodecalin.

It is an object of the present invention to use perfluorodecalin to carry oxygen away from algae after photosynthesis to facilitate growth of the algae.

It is yet another object of the present invention to provide a method of increasing the fatty acid content of algae which is used in production of biofuels.

It is a further object of the present invention to provide a photobioreactor for use with the method for increasing the production of algae using perfluorodecalin.

Another object of the present invention is to provide a method for the elimination of carbon dioxide from waste gases using an absorbent composition.

A further object of the present invention is to provide an absorbent composition which increases the growth rate and lipid content of photoautotrophs.

It is yet another object of the present invention is to provide an absorbent apparatus that uses an absorbent composition to eliminate carbon dioxide from waste gases.

It is a further object of the present invention to provide a system including an absorbent composition to eliminate carbon dioxide from waste gases to use in the production of biomass.

Another object of the present invention is to provide a method for operating a photobioreactor using carbon dioxide absorbed from waste gases by use of the absorbent composition.

A further object of the present invention is to provide a method for operating an open-pond system using carbon dioxide absorbed from waste gases by use of the absorbent composition.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

In accordance with the invention, a new method for the elimination of carbon dioxide from waste gases using an absorbent composition is disclosed. When waste gases are contacted with the absorbent composition, the carbon dioxide within the waste gases is absorbed or dissolved into the absorbent composition thereby eliminating carbon dioxide from the waste gases.

Figure 1:
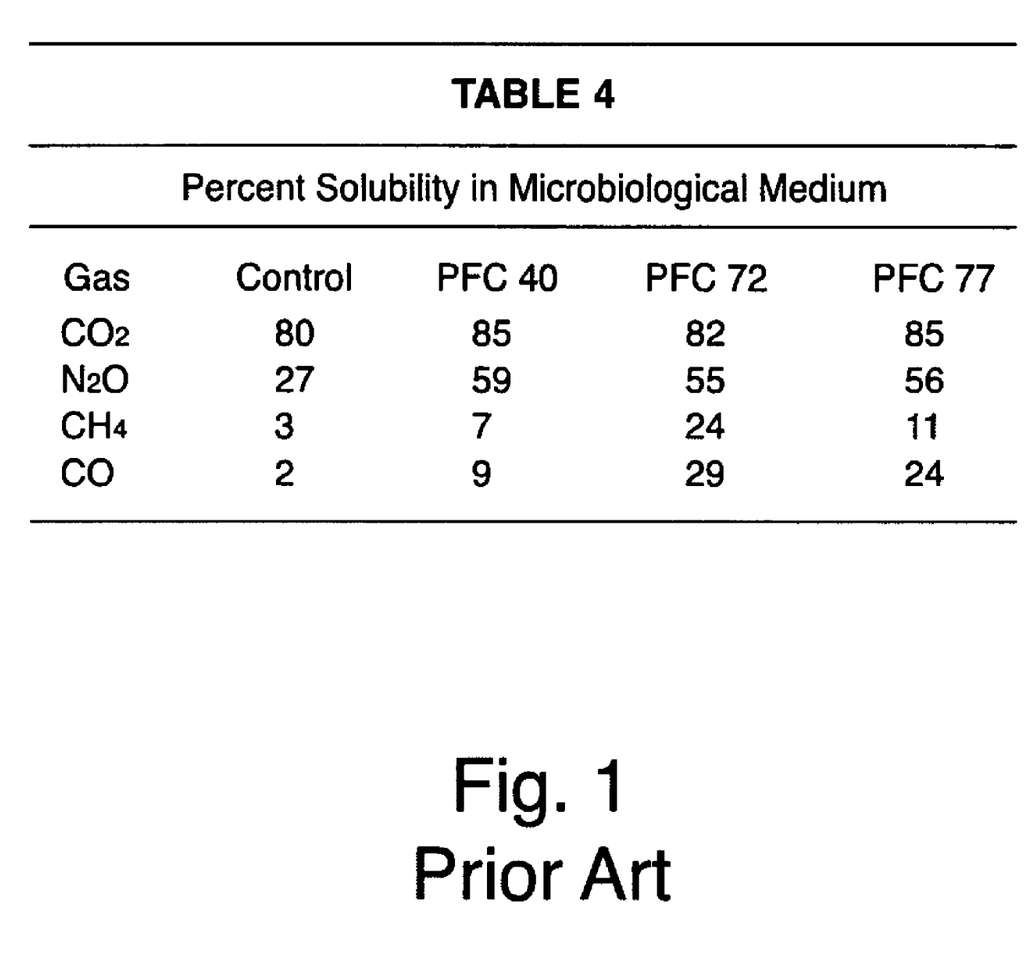
FIG. 1 is a prior art table from U.S. Pat. No. 5,637,499 disclosing the increase of solubility of carbon dioxide in a microbiological medium when using perfluorodecalin.
Figure 2:
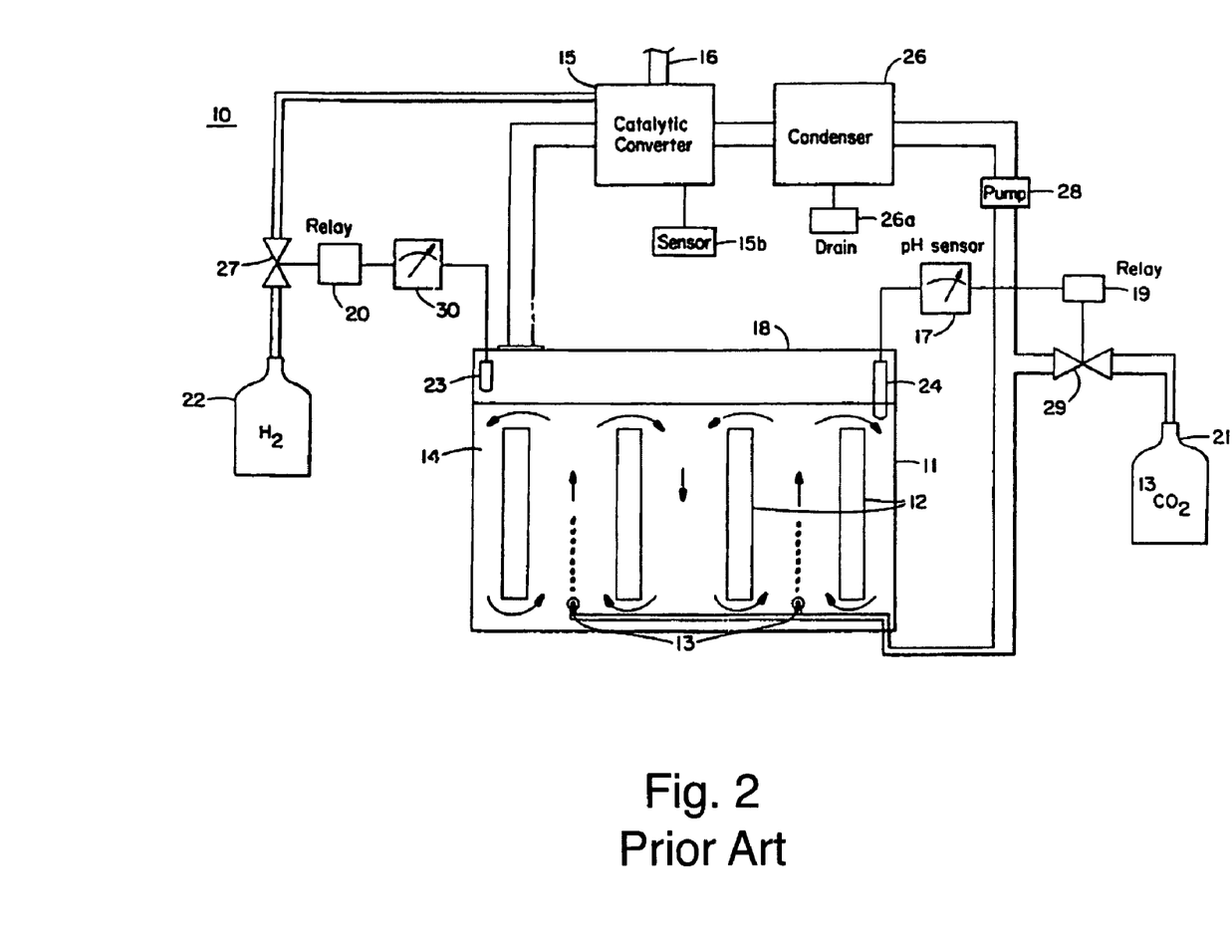
FIG. 2 is a prior art schematic view of a photobioreactor as an example of a photobioreactor for use in the method of the present invention.
Figure 3:
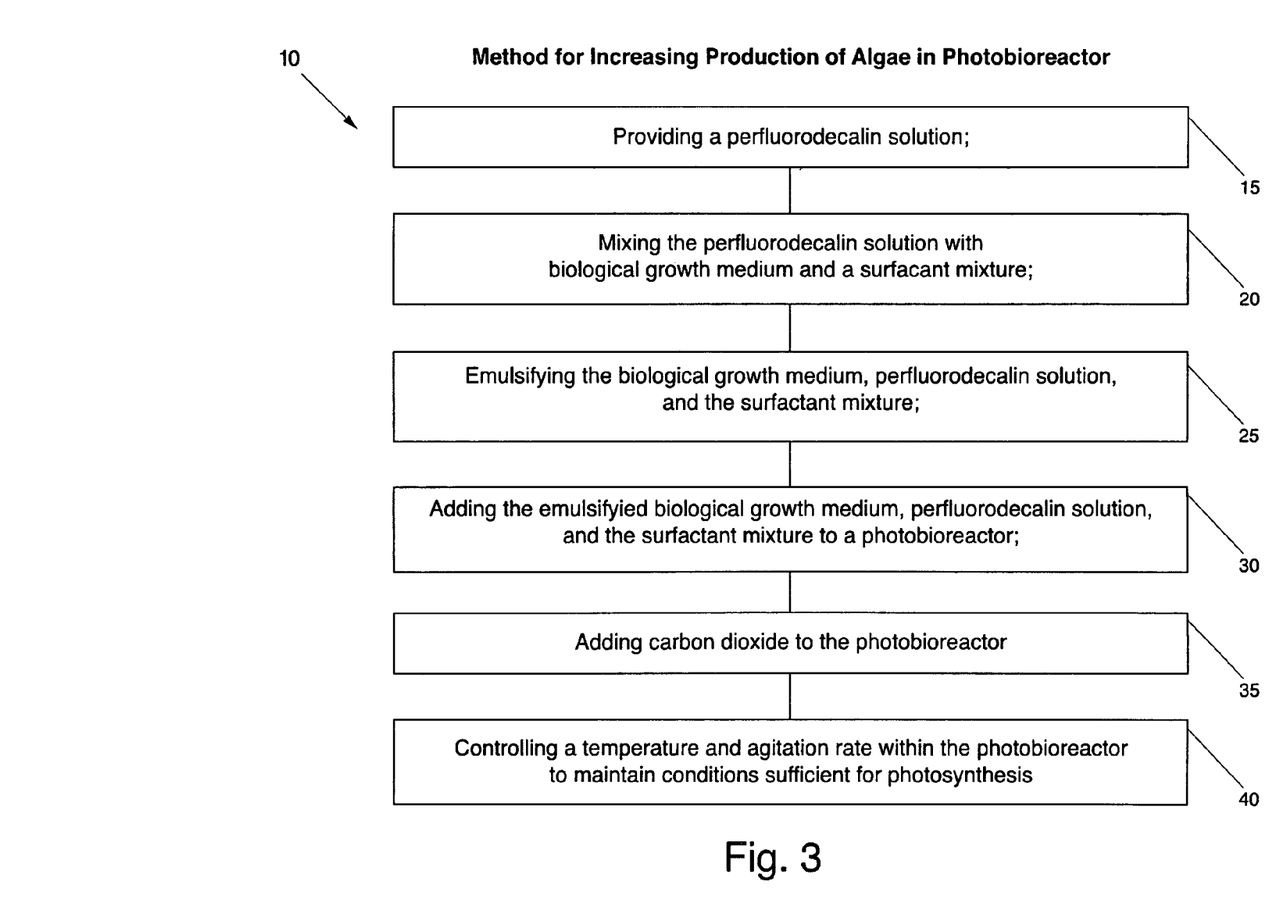
FIG. 3 is a block diagram of the method for increasing production of algae in a photobioreactor.

As shown in FIG. 3, the present invention is a method of transferring carbon dioxide in increased concentrations using perfluorodecalin for growth of algae in a photobioreactor 10. Algae is known for attracting and accumulating on its surface both carbon dioxide and oxygen as long as space is available. By way of example, a photobioreactor is used throughout this description but, by no means, is the photobioreactor the only bioreactor suited for production of algae for use in the present invention. By way of example only, a photobioreactor that is used in the prior art is illustrated at FIG. 2. By adding perfluorodecalin to the biological growth medium within the photobioreactor system, the solubility of carbon dioxide will be increased in the biological growth medium. The increased concentration of carbon dioxide is then available for use by the algae in photosynthesis and thus the productivity of algae will increase. Furthermore, since perfluorodecalin will also carry oxygen away from the algae, it is believed that perfluorodecalin will further enhance the growth and fat content of the algae.

Perfluorodecalin can be used as 4% to up to 20% solution without significantly affecting the nutritional media for algae growth. Due to its small size, perfluorodecalin will be filtrated easily from algae during the harvesting. After simple recycling, it can be used again for algae growth. Perfluorodecalin is reusable and has an extended life.

Perfluorodecalin is capable of dissolving large amounts of oxygen and carbon dioxide in a biological growth medium and acts as the carrier of oxygen and carbon dioxide. Perfluorodecalin will tend to circulate in dependent areas and those areas where gas exchange is most diminished. Overall, the benefits of perfluorodecalin are improved gas exchange for use in the production of algae. To date, there is no known use of perfluorodecalin in a method of increasing the productivity and growth of algae in a photobioreactor system. The method of the present invention is further explained below.

Referring to FIG. 3, the present method begins by providing a perfluorodecalin solution 15 and mixing it with a biological growth medium and a surfactant 20. The biological growth medium is suited to support algae capable of photosynthetically utilizing carbon dioxide and the surfactant capable of being emulsified. It is contemplated other perfluorocarbons, other than perfluorodecalin, may be used in the current method. In a preferred embodiment, the biological growth medium is an aqueous solution, such as water.

The biological growth medium, perfluorodecalin solution, and surfactant mixture are then emulsified by circulation in a high-pressure emulsifier so that the perfluorodecalin solution is in the distributed state throughout the emulsified biological growth medium 25. In a preferred embodiment, the surfactant mixture contains phospholipids. The present method uses perfluorocarbons, preferably perfluorodecalin, or phospholipids or both chemicals to increase productivity and growth of algae.

The emulsified biological growth medium, perfluorodecalin solution, and surfactant mixture are then added to a photobioreactor containing algae capable of photosynthetically utilizing carbon dioxide 30. After adding carbon dioxide to the photobioreactor containing emulsified growth medium 35, perfluorodecalin solution, and surfactant mixture, the carbon dioxide dissolves in the perfluorodecalin solution at a higher concentration than in the growth medium.

Once photosynthesis begins in the photobioreactor, the temperature and agitation rate of the biological growth medium, perfluorocarbon solution and algae within the photobioreactor are maintained sufficiently for the algae to perform photosynthesis using carbon dioxide from the perfluorodecalin solution, thereby increasing the growth rate of the algae in increased concentration of carbon dioxide due to the increased solubility of carbon dioxide in the perfluorodecalin solution 40.

During photosynthesis in the photobioreactor, the perfluorodecalin releases carbon dioxide into the biological growth media for use by algae in photosynthesis. It is contemplated that the, in one embodiment, the perfluorodecalin is pretreated with carbon dioxide before entering the photobioreactor. After releasing the carbon dioxide, the perfluorodecalin absorbs oxygen produced as a byproduct of photosynthesis using perfluorodecalin to moves away from the algae. This release of carbon dioxide and absorption of oxygen by perfluorodecalin facilitates maintaining a steady state saturation level of carbon dioxide surrounding the algae.

In addition, by adding and regulating the perfluorodecalin for use in increasing the concentration of carbon dioxide, an increased production of fatty acids is provided in the algae. A higher fat content of algae is desirable in the production of alternative fuels, such as biodiesel. As a result, perfluorodecalin works as a carrier for transporting carbon dioxide to the algae and absorbing oxygen to move it away from algae. The method results in the increase of the growth rate and fat content of algae.

By maintaining a steady state saturation level of carbon dioxide, the growth rate and fatty acids of algae will increase. This algae with fatty acids is desirable for production of oils used in biofuels once removed from the photobioreactor. To begin, the algae are harvested from the container by separating the algae from the emulsion containing perfluorodecalin solution. Once the algae are harvested, the perfluorodecalin solution is recycled from the container for future use. To assist in the production of biofuel, the oils are extracted from the algae for use in production of biofuel.

TABLE 1

| HOURS | Perfluorodecalin Solution and Water | Water Only |
|---|---|---|
| 2 | 0.1 | 0.1 |
| 4 | 0.5 | 0.5 |
| 6 | 1.1 | 1.0 |
| 8 | 2.9 | 3.0 |
| 10 | 4.4 | 4.0 |
| 12 | 5.6 | 5.0 |
| 14 | 6.0 | 6.0 |
| 16 | 7.1 | 6.6 |
| 18 | 9.8 | 6.8 |
| 20 | 11.4 | 6.6 |
| 22 | 12.2 | 6.9 |
| 24 | 13.0 | 7.0 |
| 26 | 13.2 | 7.0 |
| 28 | 13.5 | 7.0 |
| 30 | 13.7 | 7.0 |
| 32 | 13.9 | 7.0 |
| 34 | 14.0 | 6.9 |
| 36 | 14.5 | 7.1 |
| 38 | 15.0 | 7.0 |
| 40 | 15.3 | 6.9 |
| 42 | 15.5 | 7.0 |
| 44 | 15.7 | 6.9 |
| 46 | 16.0 | 6.8 |
| 48 | 16.0 | 6.5 |

EXAMPLE 1

An experiment for testing the solubility of carbon dioxide in a biological growth media, such as water, with and without the perfluorodecalin solution was conducted with test results shown in Table 1. The experiment consisted of placing a sample of algae into two separate vessels. One test vessel contained water only and labeled "water only". The second test vessel contained water and perfluorodecalin solution and labeled "perfluorodecalin solution and water". Next, carbon dioxide was added to both vessels containing algae. Algae contained in each vessel were provided light and nutrients to grow in addition to the water or water and perfluorodecalin solution to simulate a bioreactor. Note, the entire time period for testing was 48 hours with testing being done every 2 hours.

Figure 4:
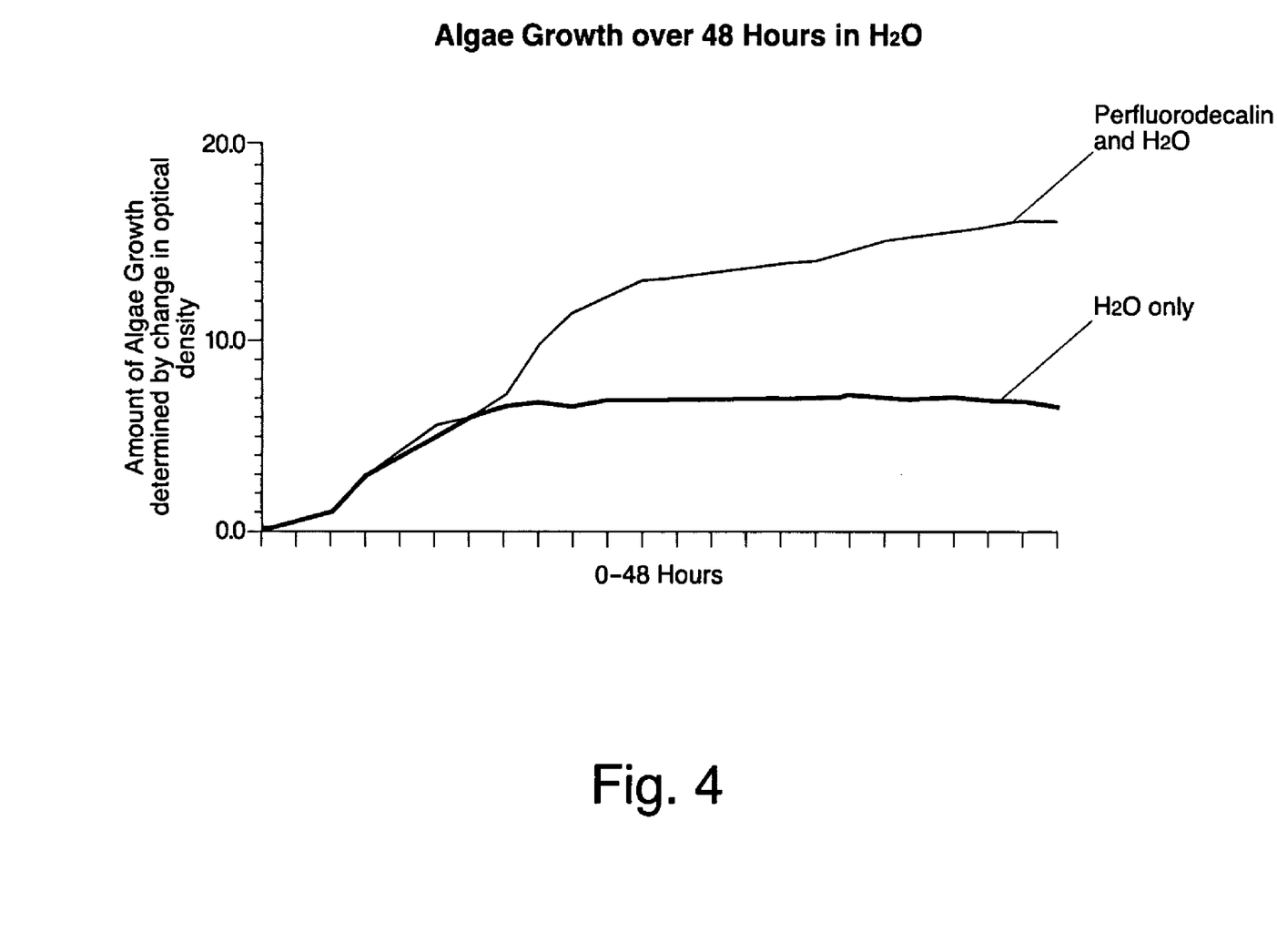
FIG. 4 is a graph of algae growth in water or water with perfluorodecalin when carbon dioxide is added.

Referring to a graph in FIG. 4, the vessel with "water only" showed a continuous growth rate for the first 22 hours and then the growth rate for the algae stagnated. The vessel with "perfluorodecalin solution and water" maintained continuous growth of the algae throughout the 48 hours with a slight slow down around 46 hours. From reviewing the results of Table 1, the growth of algae in carbon dioxide inside the vessel containing "perfluorodecalin solution and water" over the 48 hour period was approximately 2.5 times better than the vessel containing "water only".

A lab bench test was performed using an equipment to simulate a bioreactor produced the results in Table 1. Without being bound to any particular theory, it is believed that the growth rate of the algae would be greater than 2.5 times, possibly four times greater, using the perfluorodecalin solution and water inside a bioreactor setting.

TABLE 2

| HOURS | Perfluorodecalin Solution and Water | Water Only |
|---|---|---|
| 2 | 98 | 98 |
| 4 | 98 | 98 |
| 6 | 98 | 92 |
| 8 | 98 | 90 |
| 10 | 98 | 83 |
| 12 | 98 | 78 |
| 14 | 98 | 70 |
| 16 | 98 | 67 |
| 18 | 98 | 64 |
| 20 | 98 | 60 |
| 22 | 98 | 56 |
| 24 | 97 | 50 |
| 26 | 97 | 48 |
| 28 | 97 | 46 |
| 30 | 97 | 43 |
| 32 | 96 | 40 |
| 34 | 95 | 36 |
| 36 | 96 | 32 |
| 38 | 96 | 30 |
| 40 | 95 | 29 |
| 42 | 96 | 29 |
| 44 | 96 | 29 |
| 46 | 96 | 28 |
| 48 | 96 | 28 |

EXAMPLE 2

An experiment for testing the amount of carbon dioxide that remains in a biological growth medium, such as water, with and without the perfluorodecalin solution after adding algae was conducted with test results shown in Table 2. One test vessel contained water only and labeled "water only". The second test vessel contained water and perfluorodecalin solution and labeled "perfluorodecalin solution and water". Next, carbon dioxide was added to both vessels.

After the carbon dioxide was added, a sample of algae was placed into the separate vessels. Algae contained in each vessel were provided light and nutrients to grow in addition to the water or water and perfluorodecalin solution to simulate a bioreactor. Note, the entire time period for testing was 48 hours with testing being done every 2 hours.

Figure 5:
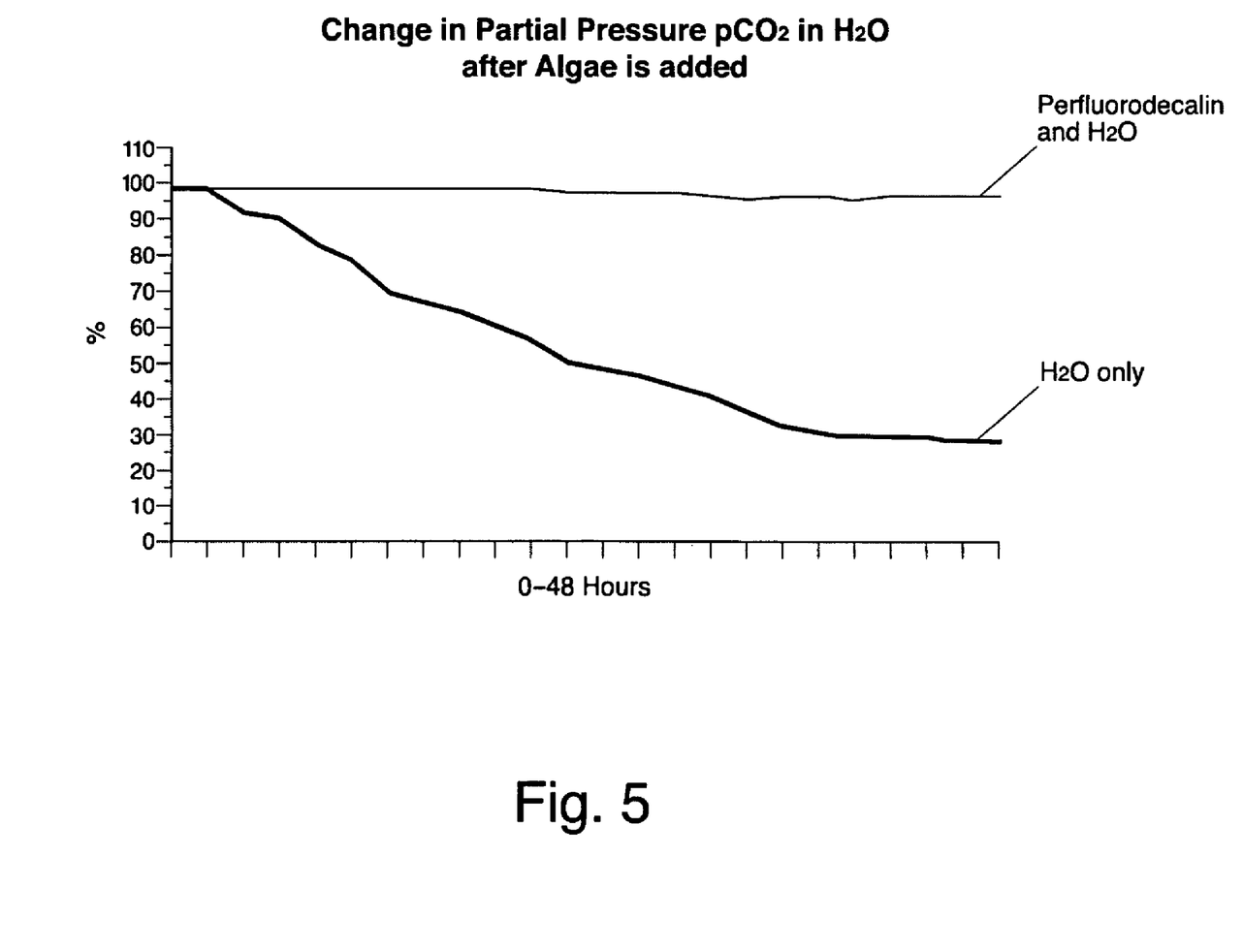
FIG. 5 is a graph of change in partial pressure of carbon dioxide in water or water with the perfluorodecalin after algae is added.

Referring to a graph in FIG. 5, the vessel with "water only" showed a continuous decline of partial pressure of carbon dioxide throughout the 48 hour period. The vessel with "perfluorodecalin solution and water" maintained a high partial pressure of carbon dioxide throughout the 48 hours. From reviewing the results of Table 2, the partial pressure of carbon dioxide inside the vessel containing "perfluorodecalin solution and water" over the 48 hour period was maintained, declining approximately 2%, while the vessel containing "water only" had a sharp decline beginning around 6 hours and dropping approximately 70%.

The present invention also consists of a photobioreactor system used in the method for increased production of algae. The photobioreactor system has a container for containing algae and a light within the container for photosynthesis. The photobioreactor system has a means for introducing emulsion containing biological growth medium, perfluorodecalin solution, and surfactant mixture to contact the algae. The photobioreactor system has a means for introducing carbon dioxide into the container such that the carbon dioxide dissolves in the perfluorodecalin solution at a higher concentration than in the growth medium and the carbon dioxide photosynthetically reacts with the algae in said container means in the presence of light. The photobioreactor has a means for controlling a temperature and agitation rate of the growth medium, perfluorodecalin solution and algae within the photobioreactor to maintain conditions sufficient for the algae to perform photosynthesis using carbon dioxide from the perfluorodecalin solution, thereby increasing the growth rate of the algae in increased concentration of carbon dioxide due to the increased solubility of carbon dioxide in the perfluorodecalin solution. The photobioreactor has a means for circulating the emulsion within said container to facilitate photosynthesis of algae within said container.

The photobioreactor is used for extracting algae for use in production of biofuels. The photobioreactor has a means for harvesting algae from said container and a means for recycling perfluorodecalin solution from said container for future use. Once the algae are retrieved, the photobioreactor may further include a means for extracting the oils from algae obtained from said container for use in production of biofuel.

Figure 6:
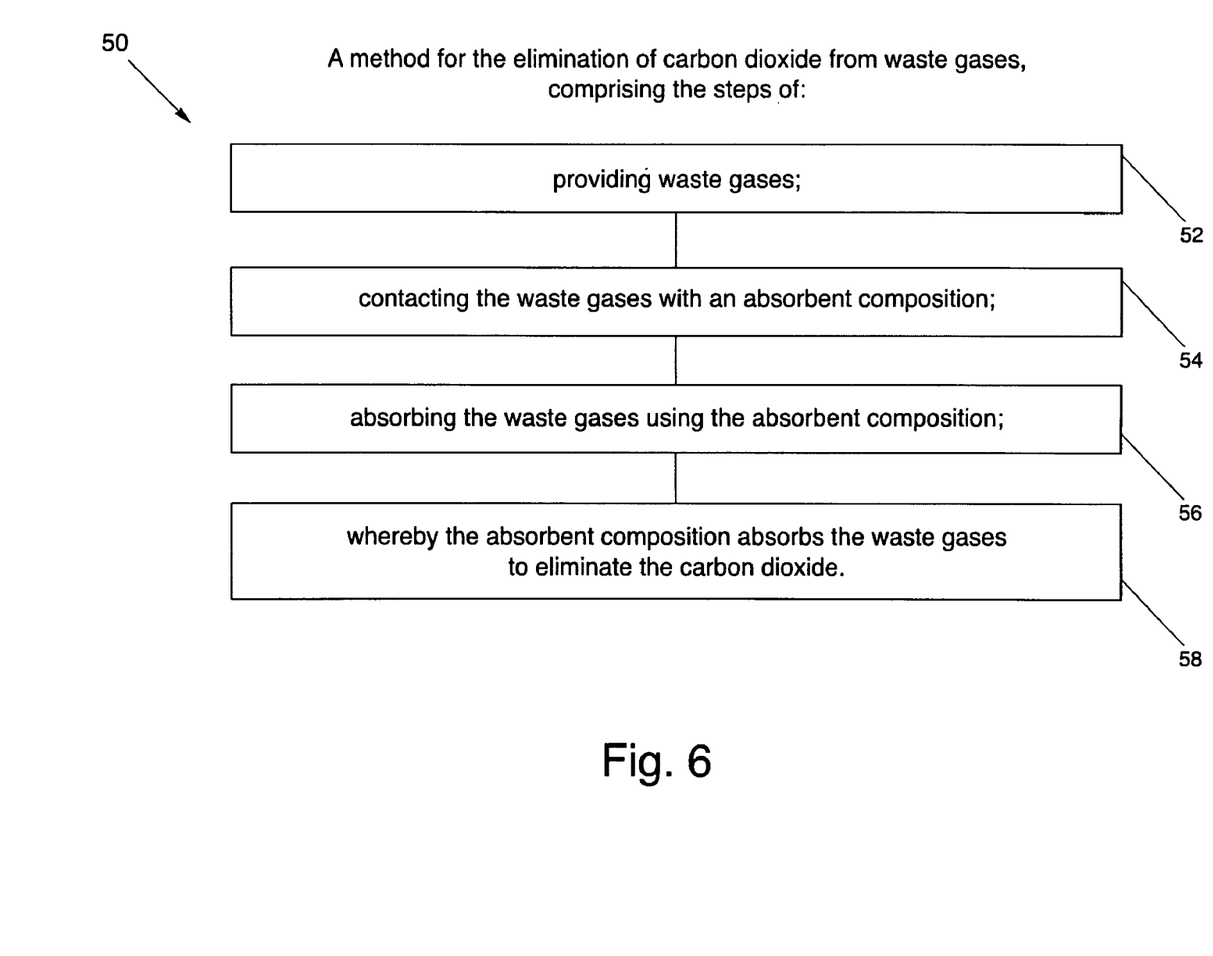
FIG. 6 is a block diagram of a method for the elimination of carbon dioxide from waste gases.

Now referring to FIG. 6, the invention provides a method for the elimination of carbon dioxide from waste gases which includes the following steps 50. First, waste gases, which include carbon dioxide, are provided from a waste gas source 52. The waste gas source includes the following: combustion of fuels, especially fossil fuels, conversion from methane in a hydrogen plant, vehicle exhaust, power plant emissions, fermentation of sugar, thermal decomposition of limestone, sodium phosphate manufacturing, landfills, carbon dioxide springs, and any other carbon dioxide source where the byproduct of the process, system, or the source itself is partially, wholly, or in part consisting of carbon dioxide. It is contemplated that there are many more waste gas sources than cited above and by no means should this list reflect any limitation on the waste gas sources that includes carbon dioxide to be used in the method.

Next, the waste gases are contacted with an absorbent composition 54. The absorption composition is used in the method for elimination, absorption, collection, or removal of carbon dioxide from waste gases from waste gas sources. The present method may use perfluorocarbons, fluorocarbons, a derivate of decalin, or perfluorodecalin in the absorbent composition. It should be noted that the absorbent composition may be contained in an absorbent apparatus, further explained herein, which is configured based upon the waste gas source and the waste gas delivery system.

In a preferred embodiment, the absorbent composition includes a perfluorodecalin solution. The perfluorodecalin may also be used in conjunction with or in combination with other solutions or chemicals to increase the adsorption of carbon dioxide form the waste gases. For example, the absorbent composition may also include a biological growth medium, such as an aqueous medium mixed with nutrition to facilitate photosynthesis for photoautotrophs. Also, the absorbent composition may also further include a surfactant containing phospholipids or other surfactants, solutions, or chemicals for use in a photobioreactor, open-pond system, or other environment where photosynthesis occurs.

Without being bound to any theory, it is believed the solubility of carbon dioxide in the absorbent composition containing perfluorodecalin solution significantly exceeds the solubility of the carbon dioxide in water alone. It is also believed that a four percent solution of perfluorodecalin increases carbon dioxide saturation of the solution up to eight times if compared with water without changing the osmolarity and pH of the solution.

After contacting the absorbent composition, the waste gases, especially the carbon dioxide, are then absorbed by the absorbent composition 56. The absorbent composition, as stated above, includes perfluorodecalin solution. By using perfluorodecalin, the absorbent composition is able to absorb carbon dioxide better and at a higher concentration than water alone. The method may also further include separating water and residual or wanted gases from the waste gases. The absorbent composition thereby absorbs the waste gases to eliminate the carbon dioxide.

The absorbent composition saturated with carbon dioxide ($CO_2$) absorbed from waste gases is then usable to facilitate growth of biomass, such as photoautotrophs, during photosynthesis. In one embodiment, the photoautotroph is algae. As stated above, photosynthesis requires carbon dioxide to be performed and the greater the concentration of carbon dioxide then the better growth rate and fatty acid or lipid contact of the biomass. Essentially, the method for elimination of carbon dioxide from waste gases results in the biosequestering of the waste gases in biomass through photosynthesis.

Also, the invention provides an absorbent composition used for increasing growth rate of biomass, such as photoautotrophs, or any other organism that uses photosynthesis or carbon dioxide. In a preferred embodiment, the photoautotroph is algae. The absorbent composition for increasing the growth rate of biomass includes the absorbent composition saturated with carbon dioxide absorbed from waste gases. The absorbent composition may also be saturated with carbon dioxide before entering an environment for photosynthesis, such as a photobioreactor or open-pond system, during the process of photosynthesis in the environment, or at any time desirable to facilitate the growth and fat acid content of biomass. Note, the absorbent composition may also be saturated with carbon dioxide from sources other than waste gas sources.

Figure 7:
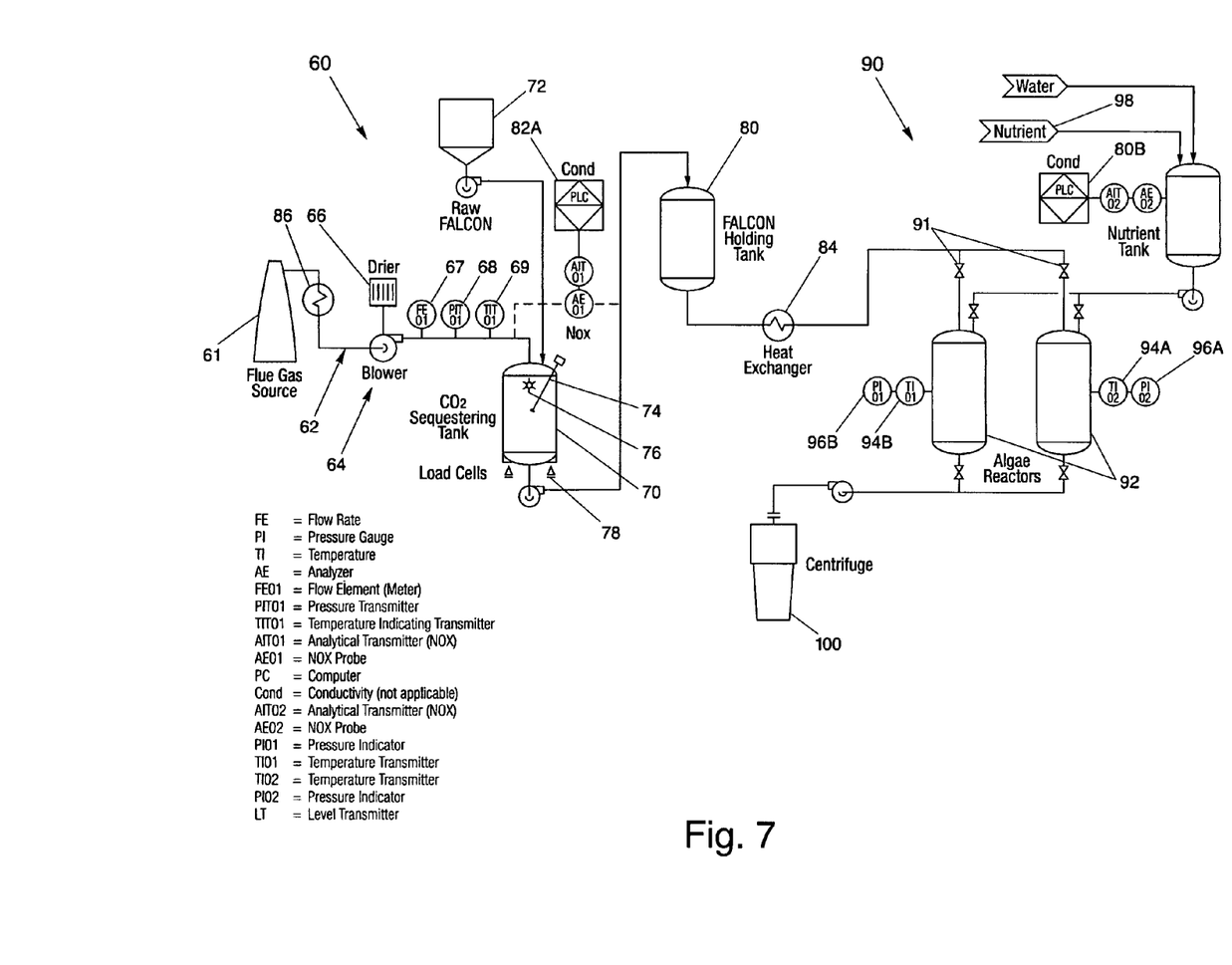
FIG. 7 is a schematic drawing of the system for eliminating carbon dioxide from waste gases to use in production of biomass.

In addition, referring to FIG. 7, the invention provides a system for eliminating carbon dioxide from waste gases to use in the production of biomass 60. The biomass, in one embodiment, is photoautotrophs and more specifically algae but can be any biomass used to produce renewable energy. In one embodiment, the system provides a waste gas delivery system 62 for providing waste gases. The waste gas delivery system includes a flue gas source 61, such as a flue stack, which generates a waste gas including carbon dioxide. The flue gas source 61 emits a flue gas and which is moved along a series of fluid connections and pumps throughout the system 60. Next, an optional heat exchanger 86 regulates the proper temperature of the absorbent composition 72 before a blower 64 moves the flue gases along the fluid connections. Next, a drier 66 removes moisture from the flue gases. The flue gases are then monitored by flow element meter 67, pressure transmitter 68, and temperature indicating transmitter 69 as they travel into the carbon dioxide sequestering tank 70.

The absorbent composition is contained in a holding tank 72 (Raw Falcon) and then manually or automatically delivered to the carbon dioxide sequestering tank 70 through a fluid conduit. The absorbent composition is dispersed or positioned by a diffuser 76 to facilitate contact with waste or flue gases delivered by waste gas delivery system 62 within the carbon dioxide sequestering tank 70. A device mixes 74 the absorbent composition within the carbon dioxide sequestering tank 70 to increase the absorption rate and concentration of carbon dioxide within the absorbent composition. When the carbon dioxide sequestering tank reaches a certain weight, as determined by the load cells 78, this indicates that the absorbent composition has reached a predetermined saturation of carbon dioxide and is now ready for delivery to a saturated absorbent composition holding tank 80 (Falcon Holding Tank). During the operation of this system 60, 90, levels of Nitrogen oxide or NOx, are continuously monitored using a NOx sensor system 82A, 82B.

After the absorbent composition is saturated with carbon dioxide, the absorbent composition is delivered by an absorbent composition delivery system 90 to contact biomass, such as algae. After the absorbent composition exits the saturated absorbent composition holding tank 80, it passes through a second heat exchanger 84 to properly regulate the predetermined temperature of the absorbent composition.

Next, the absorbent composition enters the algae reactors 92 or photobioreactors for photoautotrophs through a valve 91, which may involve one or more algae reactors 92. Within the algae reactors, temperature 94A, 94B and pressure gauges 96A, 96B are used to monitor the temperature and pressure of the absorbent composition. Upon contacting the absorbent composition with the biomass or algae, and addition of a biological growth medium 98 and surfactant, the growth rate and lipid content of the biomass, such as algae, is increased. After reaching the proper growth of the biomass or algae, the biomass is moved into a centrifuge to separate the biomass from the absorbent composition, biological growth medium, and surfactant. A second centrifuge (not shown) may also be used to further remove the absorbent composition, specifically the perfluorodecalin solution to be reused or recycled and deposited into holding tank (Raw Falcon) 72.

The invention also provides an absorbent apparatus for absorbing carbon dioxide from waste gases. The absorbent composition for absorbing carbon dioxide from waste gases is provided within or about the absorbent apparatus. The absorbent composition is contained within the absorbent apparatus during contact with the waste gases.

Figure 8A:
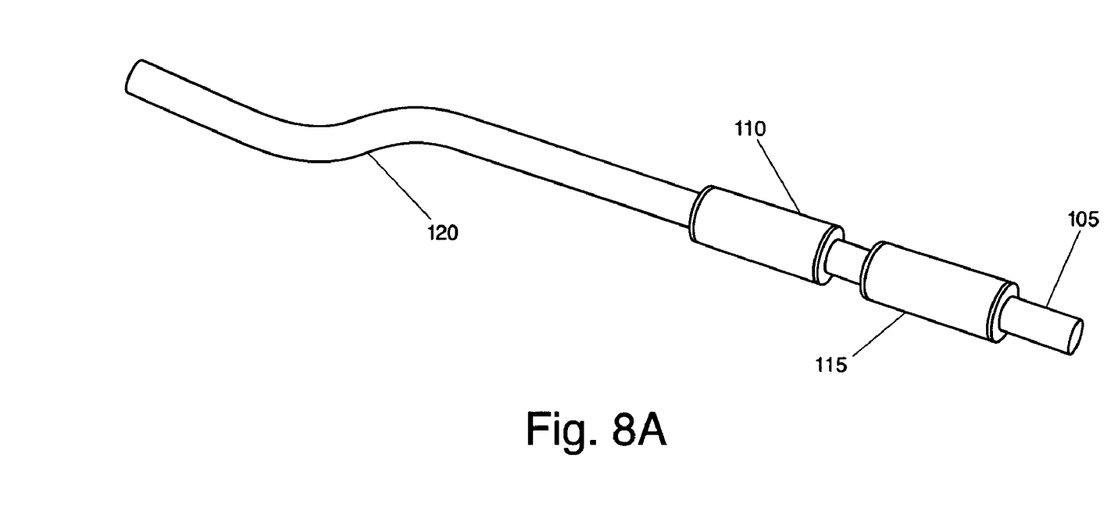
FIG. 8A is a perspective view of the vehicle absorber unit connected to an exhaust system.

For example, referring to FIG. 8A, the absorbent apparatus is a vehicle absorber unit 110 connected to an exhaust system 105 of a vehicle (not shown). In FIG. 8a, the vehicle absorber unit 110 is fluidly connected to an exhaust pipe 120 and fluidly connected to a muffler 115 of the exhaust system 105. Note, the exhaust system 105 is fluidly connected to an internal combustion engine (not shown) at the end closest to the muffler 115. The method for the elimination of carbon dioxide gases from waste gases can be used in conjunction with the vehicle absorber unit 110. The vehicle absorber unit 110 can be used to remove carbon dioxide from any gases, exhaust, or fumes generated by an internal combustion engine or other engines or power sources for a vehicle that emit waste gases, such as a car or truck. The vehicle absorber unit, by using the absorbent composition contained therein, may eliminate, absorb, collect and/or remove carbon dioxide from exhaust or waste gases emitted from the internal combustion engine.

Figure 8B:
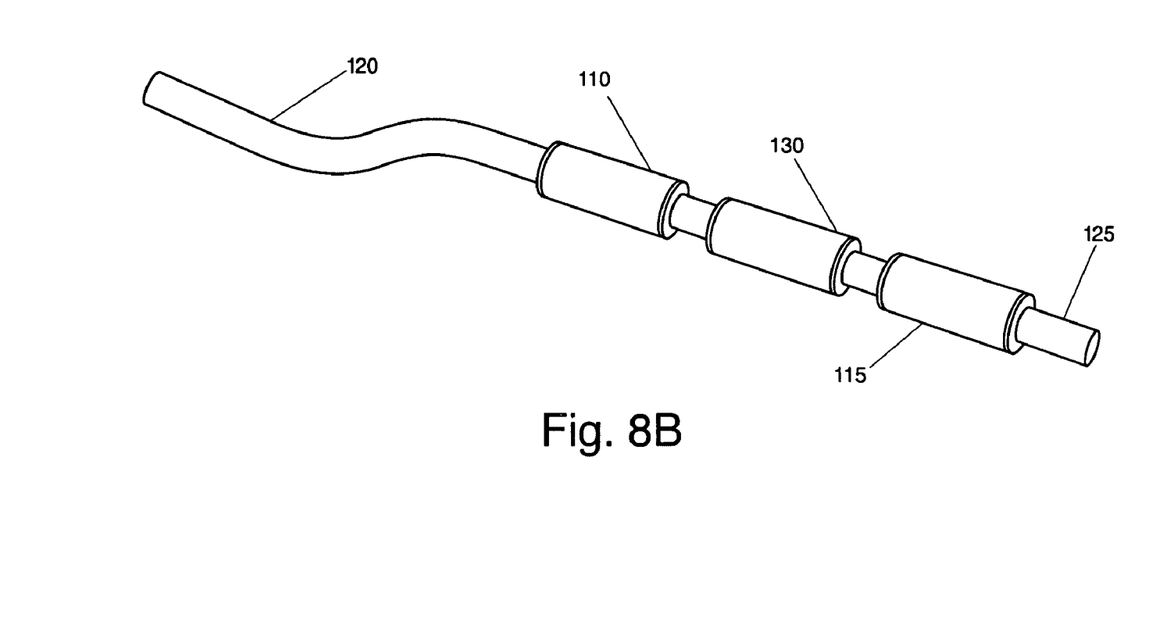
FIG. 8B is a perspective view of the vehicle absorber unit connected to an exhaust system and gas separator.

As shown in FIG. 8B, a vehicle emission gas separator can also be connected to a vehicle exhaust system 125. In one embodiment, the vehicle emission gas separator 130 is positioned between the muffler 115 and absorbent apparatus 110. Typically, vehicle emission gases consist of the following gases by percentage: nitrogen 60%, carbon dioxide 15%, nitric oxide 6%, oxygen 5%, and miscellaneous gases 14%. The separator 130 receives the vehicle emission gases and removes the carbon dioxide, nitric oxide, and some miscellaneous gases and directs them toward the vehicle absorbent unit 110. The remaining gases, nitrogen, oxygen, and various miscellaneous gases, will be directed in a separate direction and eventually released into the atmosphere. It is contemplated that the vehicle emission gas separator 130, muffler 115, exhaust systems 105, 125, and vehicle absorber unit 110 may have a variety of configurations and FIGS. 8A-8B are intended as examples.

Figure 9:
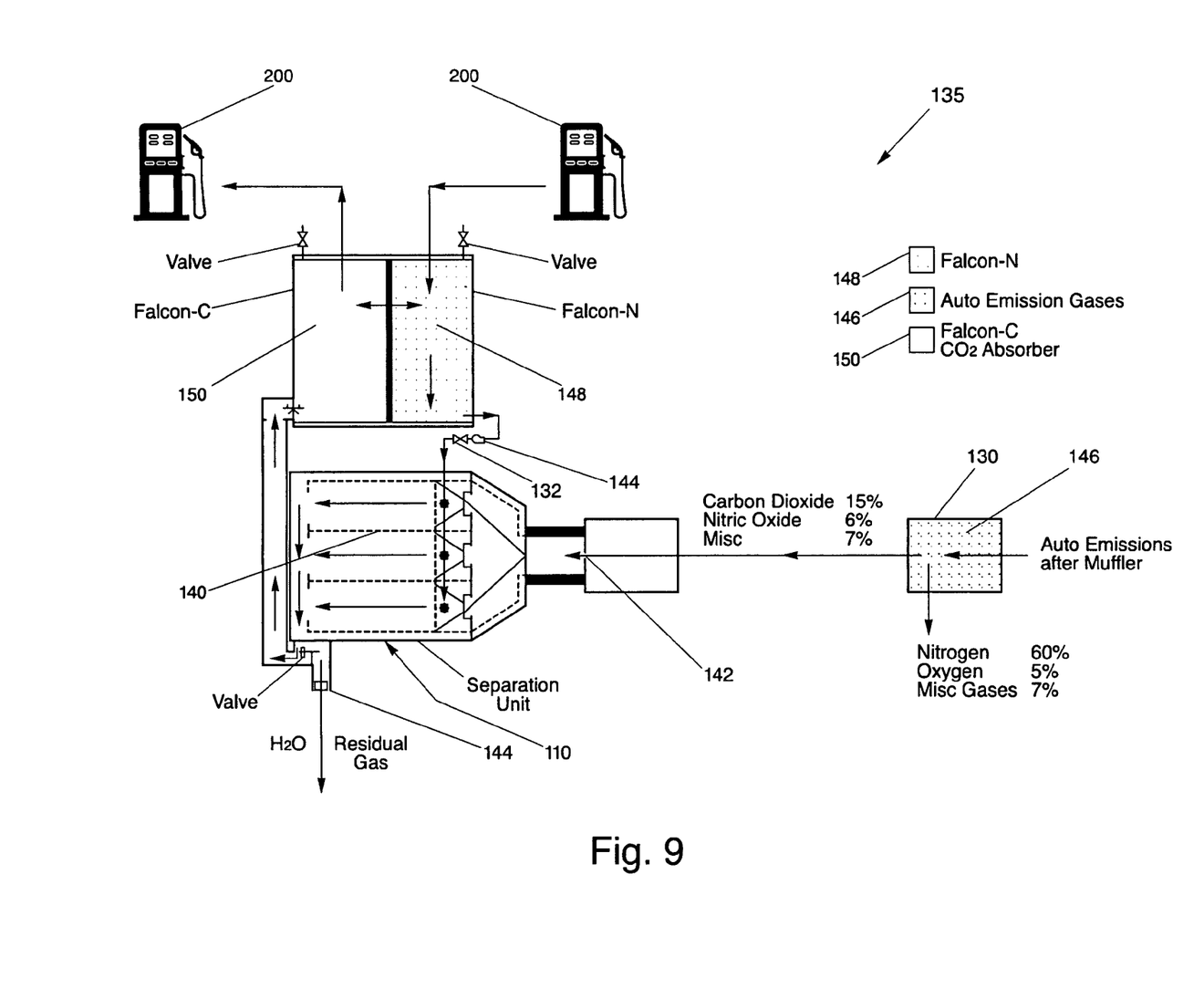
FIG. 9 is a schematic drawing of a system using the vehicle absorber unit to eliminate carbon dioxide from waste gases.

Now referring to FIG. 9, a schematic drawing of a system 135 using the vehicle absorber unit 110 to eliminate carbon dioxide from waste gases is shown. The vehicle absorber unit 110, shown in a cross-section, contains multiple units of tubular structures 130 with a place for injection 132 of absorbent composition (FRESH FALCON-N) 148 and a centered opening or aperture 142 for exhausted or waste gases 146 emitted from an engine (not shown). Under the pressure of exhausted gases an absorbent composition adheres to the wall and moves under the pressure created by absorbent pump 144. Length of the tubes 130 and their number as well as diameters depends on the amount of carbon dioxide that is getting released from the engine or other source of power. Absorption of carbon dioxide and other harmful gases (components of FALCON-C) occurs during the movement of exhausted gases through the length of tube 130. At the end of the tube 144, water and absorption composition are separated as two non-mixing substances. The absorption composition is not water soluble and will not mix with water.

Absorbent composition is saturated with carbon dioxide that is collected in storage tank 150 through one directional flow valve. The replacement of saturated absorption composition with carbon dioxide (FALCON-C) with an unsaturated absorption composition (FALCON-N) 148 will be made at a gas filling station 200. From the storage tank of the pumping station, the unsaturated, or clean, absorption composition is pumped through one directional valve into the vehicle absorber unit of the vehicle.

After collecting the saturated absorbent composition with carbon dioxide, the absorbent composition is eventually freed from carbon dioxide in a biosequestration process. The absorbent composition is used for carbon dioxide storage and as a releasing media for the growth of biomass in an environment configured for photosynthesis, such as photobioreactor, open-pond system, or any other natural or artificial environment configured for photosynthesis.

In another example, the absorbent apparatus is a power plant absorber unit connected to a flue source, such as a flue stack 61 from a power plant shown in FIG. 7, or other energy producing environment where waste gases or carbon dioxide is emitted. The method for the elimination of carbon dioxide gases from waste gases can be used in conjunction with a power plant which emits flue gases that include carbon dioxide. The power plant absorber unit is used for the absorption, collection and removal of carbon dioxide from flue gases. The power plant absorber unit is configured to work in conjunction with the power plant. The power plant absorber unit allows for the storage of the adsorbent composition and contacting the adsorption material with the flue gases to eliminate the carbon dioxide from the flue gases.

The waste gases are provided to the absorbent composition inside the absorbent apparatus using a waste gas delivery system. After the absorbent composition is contacted with the waste gases inside the apparatus, the absorbent composition saturated with carbon dioxide is removed from the absorbent apparatus to be used to facilitate the growth of photoautotrophs, such as algae.

Figure 10:
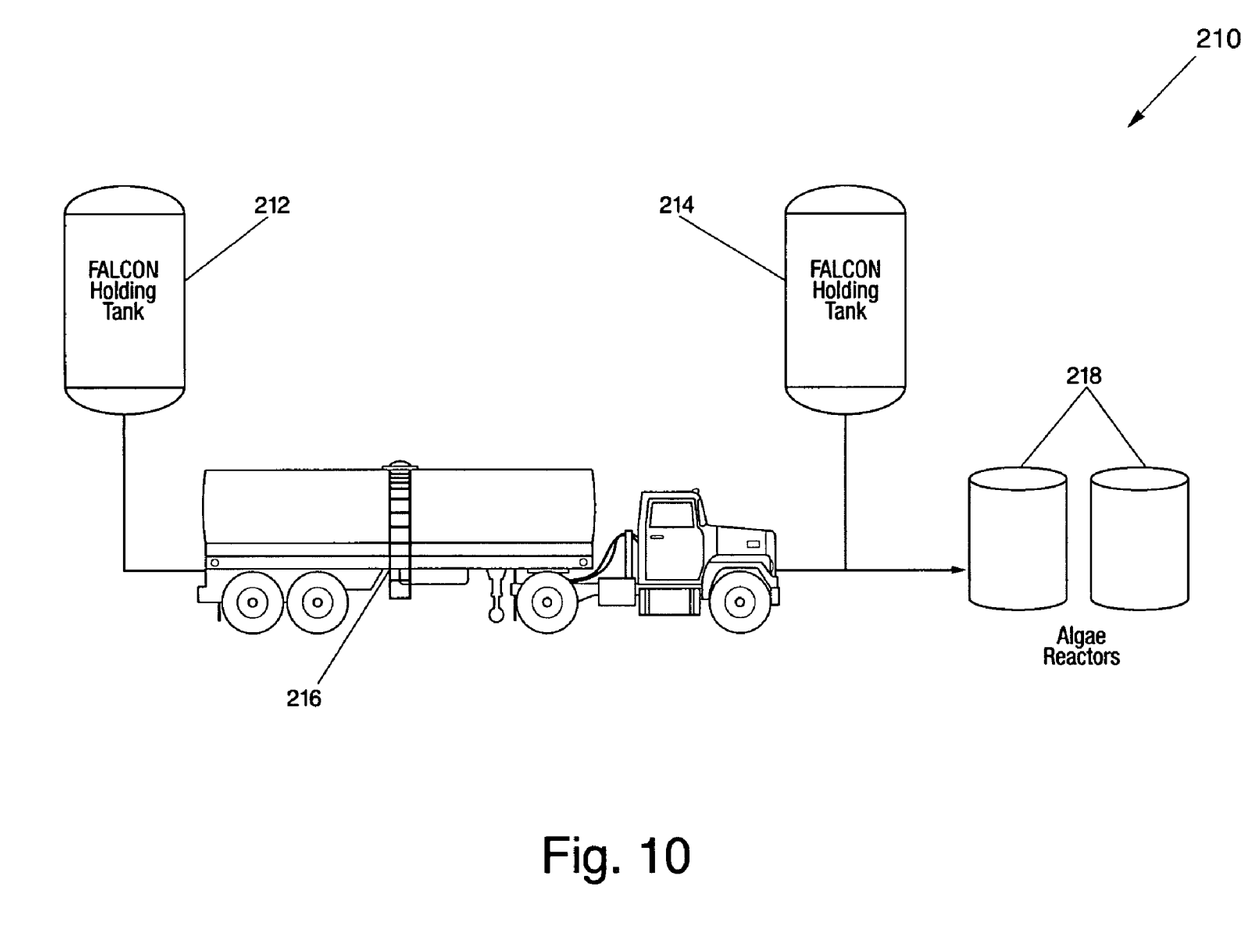
FIG. 10 is a diagram of a storage and transport system for the absorbent composition.

Referring to FIG. 10, the invention includes a method for transporting the absorbent composition saturated with carbon dioxide 210. The usage of the absorbent composition permits holding and transporting the carbon dioxide without the requirement of pressurizing and liquefying the gas. A holding tank (Falcon Holding Tank) 212, 214 filled with absorbent composition saturated with carbon dioxide is offloaded into a standard liquid bulk tank truck 216 or other vehicle for hauling fluids. The standard liquid bulk tank truck 216 may make more than one pickups of saturated absorbent composition, and at the same time, may deliver unsaturated or clean saturated absorbent if necessary to the power plant, gas station, or other environment where waste gases are absorbed by the absorbent composition. The truck 216 eventually delivers the saturated absorbent composition to any environment where photosynthesis occurs and increased carbon dioxide concentration levels are beneficial, such as algae reactors 218. Note, it is also contemplate those shipping vessels, trains, and other modes of transportation may be used to transport the saturated and unsaturated absorbent composition.

Figure 11:
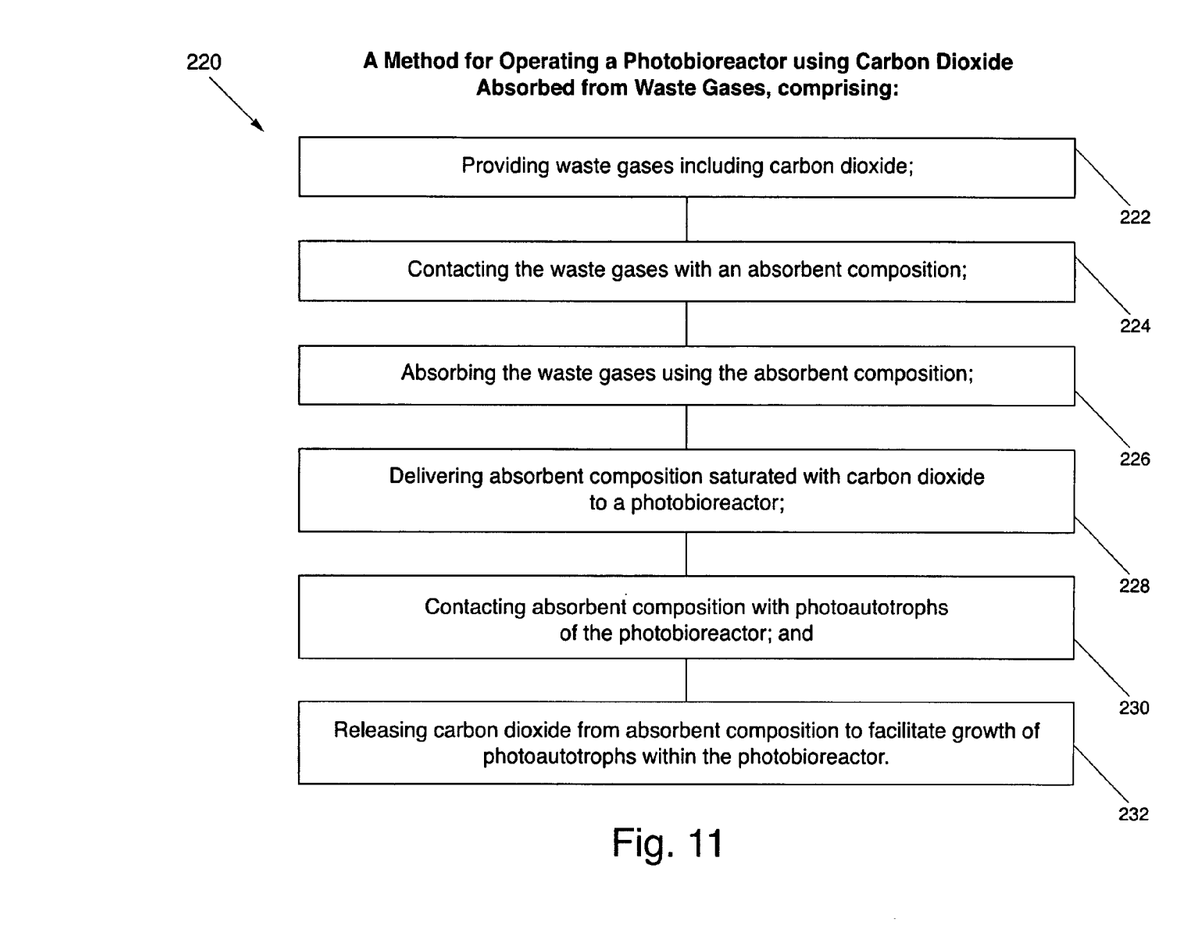
FIG. 11 is a block diagram of a method for operating a photobioreactor using carbon dioxide absorbed from waste gases.

Referring to FIG. 11, the invention provides a method for operating a photobioreactor using carbon dioxide absorbed from wastes gases 220. The method for operating the photobioreactor includes the following steps. First, waste gases are provided that include carbon dioxide by waste gas sources 222. Second, the waste gases are contacted with an absorbent composition that includes perfluorodecalin solution 224. Third, the waste gases are absorbed using the absorbent composition 226. Fourth, the absorbent composition saturated with carbon dioxide is delivered to the photobioreactor 228. Fifth, the absorbent composition contacts the photoautotrophs within the photobioreactor 230. Thereby, carbon dioxide is eventually released from absorbent composition to facilitate growth and lipid content of photoautotrophs, such as algae 232.

Figure 12:
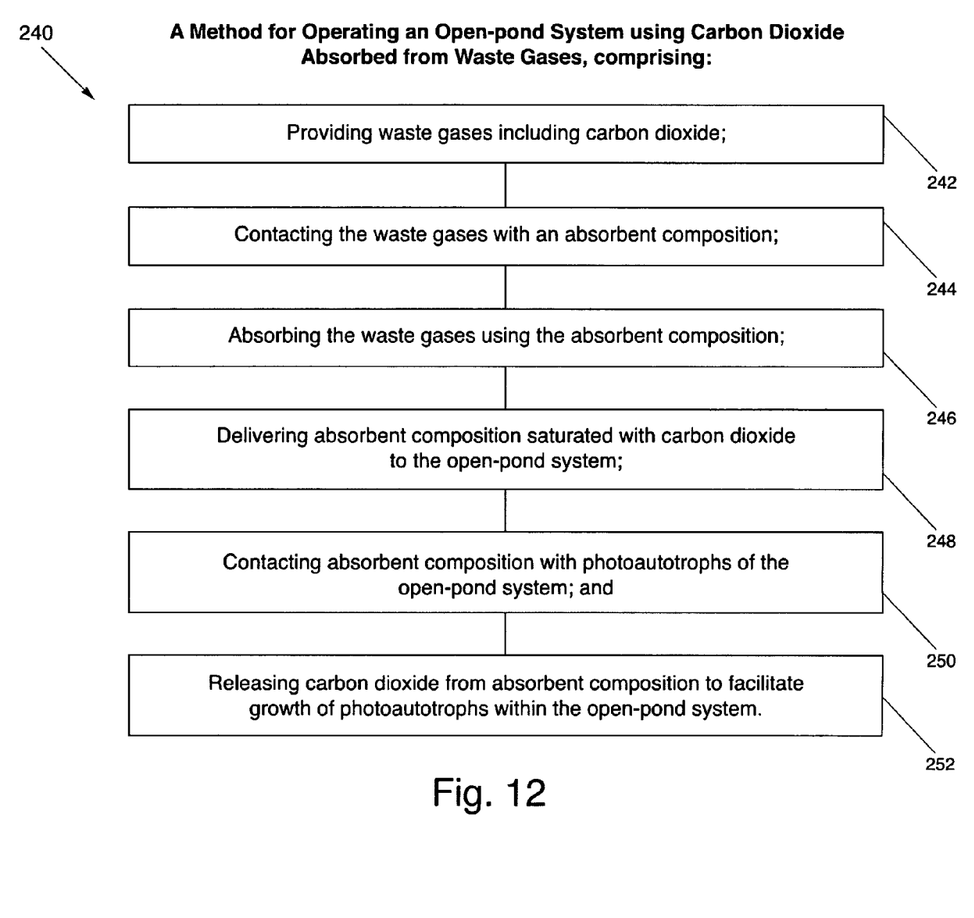
FIG. 12 is a block diagram of a method for operating an open-pond using carbon dioxide absorbed from waste gases.

Referring to FIG. 12, the invention also provides a method for operating an open-pond system using carbon dioxide from waste gases 240. The method for operating the open-pond systems includes the following steps. First, waste gases are provided that include carbon dioxide from waste gas sources 242. Second, the waste gases are contacted with an absorbent composition that includes perfluorodecalin solution 244. Third, the waste gases are absorbed using the absorbent composition 246. Fourth, the absorbent composition saturated with carbon dioxide is delivered to the open-pond system 248. Fifth, the absorbent composition contacts the photoautotrophs within the open-pond system 250. Thereby, carbon dioxide is eventually released from absorbent composition to facilitate growth and lipid content of photoautotrophs, such as algae 252.

In view of the foregoing, a new method for removing carbon dioxide from gas is provided. More specifically, a method for eliminating carbon dioxide from waste gases by contacting the waste gases to an absorbent composition. In one embodiment, the absorbent composition includes perfluorodecalin solution. When waste gases are contacted with the absorbent composition, the carbon dioxide within the waste gases is absorbed or dissolved into the absorbent composition thereby eliminating carbon dioxide from the waste gases.

It would be appreciated by those skilled in the art that various changes and modifications can be made to the illustrated embodiments without departing from the spirit of the present invention. All such modifications and changes are intended to be within the scope of the present invention.

What is claimed is:

1. A method for the elimination of carbon dioxide from waste gases, comprising the steps of:
    providing waste gases;
    contacting the waste gases with an absorbent composition comprising perfluorodecalin solution;
    absorbing the waste gases using the absorbent composition comprising perfluorodecalin solution;
    whereby the absorbent composition absorbs the waste gases to eliminate the carbon dioxide.

2. The method of claim 1, wherein the waste gases are selected from the group consisting of combustion of fuels, power plant emissions, vehicle exhaust, conversion from methane in a hydrogen plant, fermentation of sugar, thermal decomposition of limestone, sodium phosphate manufacturing, landfills, carbon dioxide springs, and any other carbon dioxide source.

3. The method of claim 1, further comprising:
    providing a means for holding the absorbent composition during contact with the waste gases.

* * * * *